US006837531B2

(12) United States Patent
Mack et al.

(10) Patent No.: US 6,837,531 B2
(45) Date of Patent: Jan. 4, 2005

(54) FLIP SEAT ARRANGEMENT HAVING UPPER SEAT BACK PIVOT

(75) Inventors: Kenneth S Mack, Metamora Township, MI (US); Thomas S Moore, Oxford, MI (US); Russell C Fielding, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/625,381

(22) Filed: Jul. 23, 2003

(65) Prior Publication Data

US 2004/0130175 A1 Jul. 8, 2004

Related U.S. Application Data

(60) Provisional application No. 60/398,221, filed on Jul. 24, 2002.

(51) Int. Cl.$^7$ .............................................. B62D 27/00
(52) U.S. Cl. ............................... 296/65.09; 296/37.15; 296/190.02; 297/188.1; 297/63; 5/118
(58) Field of Search ............................. 296/37.15, 37.8, 296/65.01, 65.05, 65.09, 65.16, 190.02; 297/378.1, 63, 188.1, 337, 378.14; 5/118

(56) References Cited

U.S. PATENT DOCUMENTS

| 3,879,081 | A | * | 4/1975 | Hockley et al. | ........ 296/190.02 |
| 4,215,899 | A | * | 8/1980 | Schmidt et al. | ........ 296/190.02 |
| 5,029,929 | A | * | 7/1991 | Sjostrom et al. | ............... 296/69 |
| 6,367,839 | B1 | * | 4/2002 | Langhoff | ..................... 280/751 |
| 6,488,327 | B1 | * | 12/2002 | Pearse et al. | ............. 296/65.05 |

FOREIGN PATENT DOCUMENTS

DE          3821917 A1 *   1/1990

* cited by examiner

Primary Examiner—Joseph D. Pape
(74) Attorney, Agent, or Firm—Ralph E. Smith (57) ABSTRACT

A rear seat assembly of a passenger cabin of a pick-up truck includes a rear seat cushion and a rear seat back, each rotatable such that a bottom surface of the rotated rear seat back can rest upon a rear end of the rotated seat cushion to provide a storage space beneath the rotated seat back and between the rotated seat cushion and a rear wall of the passenger cabin. The cargo bed of the truck may be extended into the storage space by providing an access door thereto in a front wall of the cargo bed in communication with a corresponding opening in the rear wall of the passenger cabin.

12 Claims, 9 Drawing Sheets

FLIP SEAT ARRANGEMENT HAVING UPPER SEAT BACK PIVOT

CROSS-REFERENCE TO RELATED APPLICATIONS

This application claims priority to U.S. Provisional Application No. 60/398,221 filed Jul. 24, 2002.

BACKGROUND OF THE INVENTION

The invention generally relates to movable seat assembly arrangements in a passenger cab of an automotive vehicle. More specifically, the invention pertains to a rotatable rear seat assembly of the passenger cabin of a vehicle having an external cargo bed, such as a pick-up truck.

Vehicles having external cargo beds yet expanded passenger cabins have become increasingly popular. For example, pick-up trucks with rear seating assemblies and access doors therefor are now commonplace. Such expanded passenger cabs are obtained at the expense, oftentimes, of a shorter length of the exterior cargo bed.

There is a need in the pick-up truck art for a rear seat assembly which is convertible to provide additional storage space between a front seat assembly and a rear wall of the truck's passenger cabin. Additionally, there is a need for extending a portion of the volume of the truck's exterior cargo bed into a rear area of the passenger cabin to enable objects of lengths longer than the cargo bed to be carried without extending rearwardly outside of the cargo bed.

SUMMARY OF THE INVENTION

In a first aspect of the invention, a flexible auxiliary storage arrangement for the passenger cabin of a vehicle having a cargo bed extending rearwardly from the passenger cabin includes a rear seat system positioned adjacent the rear wall of the passenger cabin and a rear seat cushion having a first hinge assembly at a forward portion of its bottom side and a rear seat back having a second hinge assembly proximate its top edge. The first hinge assembly is operative to enable the rear seat cushion to rotate forwardly to a substantially vertical position with a rear end of the rear seat cushion facing a roof of the cabin. The second hinge assembly is operative to enable the rear seat back to rotate forwardly to a substantially horizontal position with a rear surface of the rear seat back resting upon the rear end of the rear seat cushion.

In another aspect of the invention, a flexible auxiliary storage arrangement for a vehicle having a passenger cabin and a cargo bed extending rearwardly from a rear wall of the passenger cabin includes an opening in the rear wall of the passenger cabin and in communication with an opening in the front wall of the cargo bed, whereby a length of the cargo bed is extended into a rear portion of the passenger cabin.

BRIEF DESCRIPTION OF THE DRAWING

The objects and features of the invention will become apparent from a reading of a detailed description, taken in conjunction with the drawing, in which.

DETAILED DESCRIPTION

Figure 1:
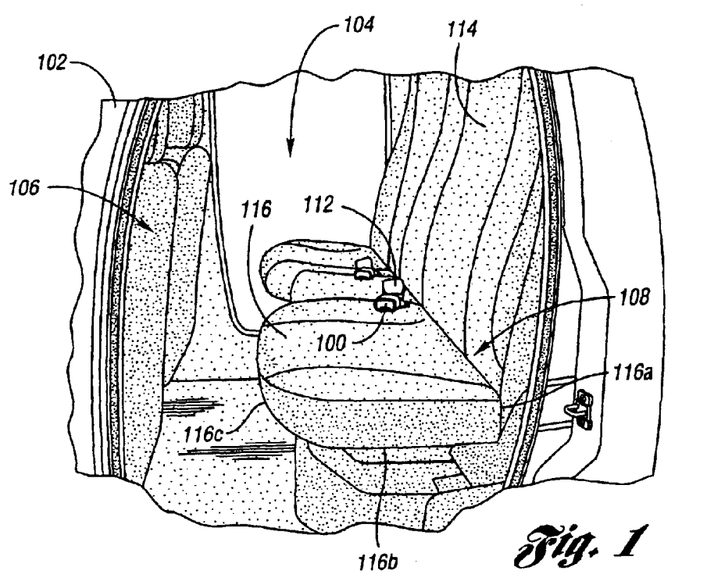
FIG. 1 is a side view of a rear seat assembly of the invention in the rest or seating position.

With reference to FIG. 1, a passenger cabin 102 of an extended cabin pick-up truck has its rear door opened to reveal the back side of a first front seating assembly 106 and a rear seating assembly 108 positioned in a rear seating area 104 of passenger cabin 102.

Rear seating assembly 108 includes a rear seat cushion 116 having a front end 116c and a bottom side 116b. A rear end 116a of rear seat cushion 116 is forward of and abuts rear seat back 114. Additionally, rear seat assembly 108 includes a plurality of seatbelt buckles 100 and mating seatbelt tongues 112 positioned conventionally at ends of the two halves of the seatbelt for a number of passengers, for example, three.

Figure 2:
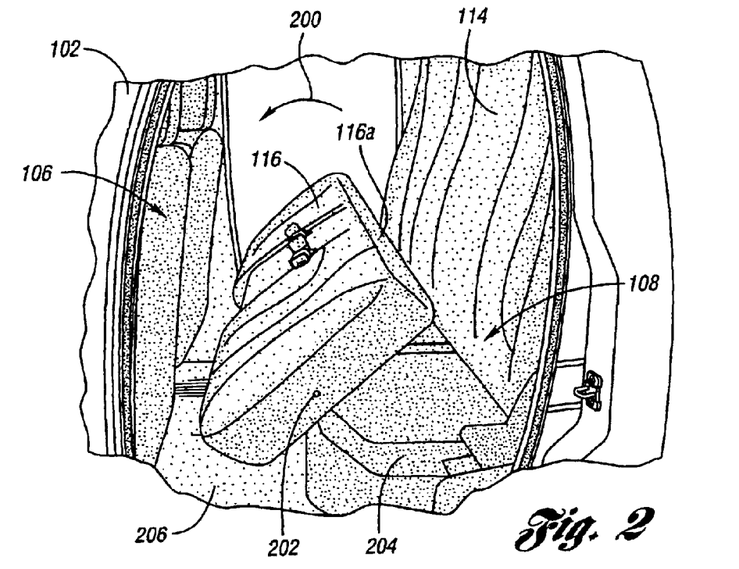
FIG. 2 is a side view of the rear seat arrangement of FIG. 1 with the rear seat cushion partially rotated forwardly.

FIG. 2 shows rear seat cushion 116 partially rotated forwardly in the direction of arrow 200 about a pivot axis 202 located beneath rear seat cushion 116 and extending adjacent a forward edge of a rear seat base 204. With this movement, rear seat cushion 116 has its front end 116c entering downwardly into the space between the front seat assembly 106 and the rear seat base 204 so as to face floor 206 of passenger cabin 102.

Figure 3:
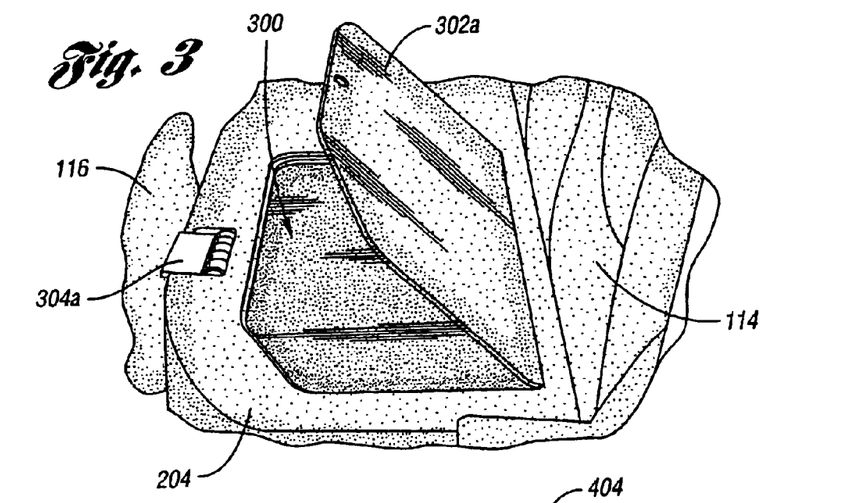
FIG. 3 is a perspective view of a storage compartment located beneath the rear seat cushion.
Figure 4:
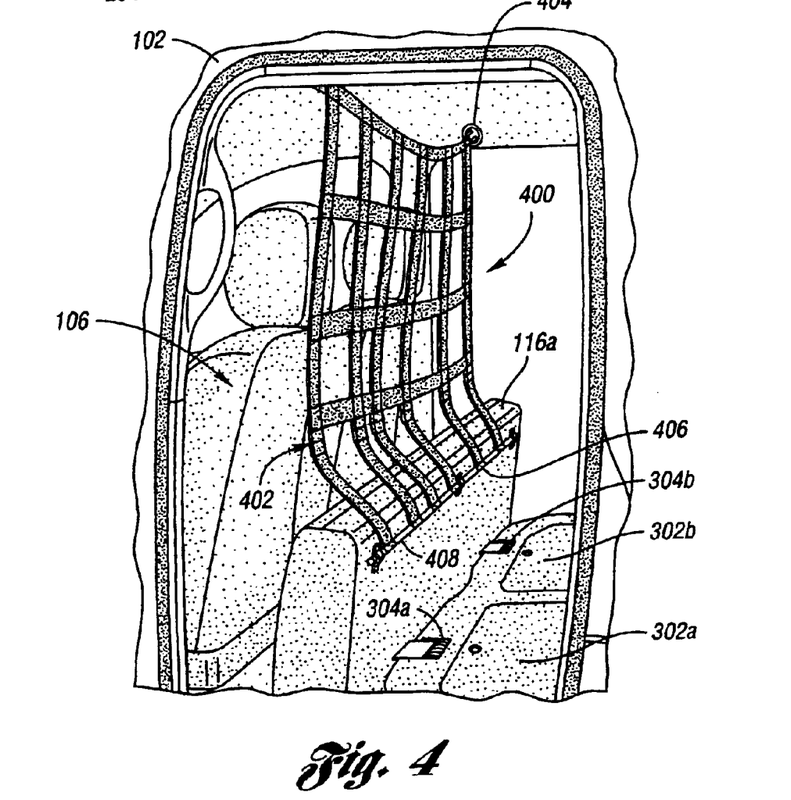
FIG. 4 shows the rear seat cushion rotated to a vertical position and attached to a netting assembly for use with a bed feature of the invention.

In FIG. 3, rear seat cushion 116 has been rotated forwardly to a vertical position exposing part of rear seat cushion hinge assembly at hinge 304a coupled between a bottom surface of rear seat cushion 116 and rear seat base 204. Also exposed in this view is a storage compartment 300 covered by a hinged access door 302a located in the rear seat base 204 beneath rear seat cushion 116 in its rest or seating position FIG. 4 is another view of the rear seating compartment showing seat cushion 116 rotated fully forwardly to its vertical position about hinge elements 304a and 304b. In this position, access is enabled to hinged storage access doors 302a and 302b for first and second storage compartments located beneath rear seat cushion 116.

Additionally shown in FIG. 4 is a occupant containment net 400 fashioned of conventional seatbelt webbing material in a cross pattern as shown. Net 400 is anchored at its top to built-in receptacles 404 in a passenger cabin roof side rail. At its bottom, net 400 is furnished with a plurality of seatbelt buckle/tongue elements 402 which couple to seatbelt elements of the rear seating arrangement 108 which are anchored at their distal ends to rear frame cross member 408 of rear seat cushion 116. Hence, alternate units 402 will have either a seatbelt buckle or a seatbelt tongue attached to an end of the net with the opposite members attached to an end of the seatbelt assembly portions of seat cushion 116. Net 400 is used in conjunction with a bed arrangement of the invention which will become apparent in a later section of this description.

Figure 5:
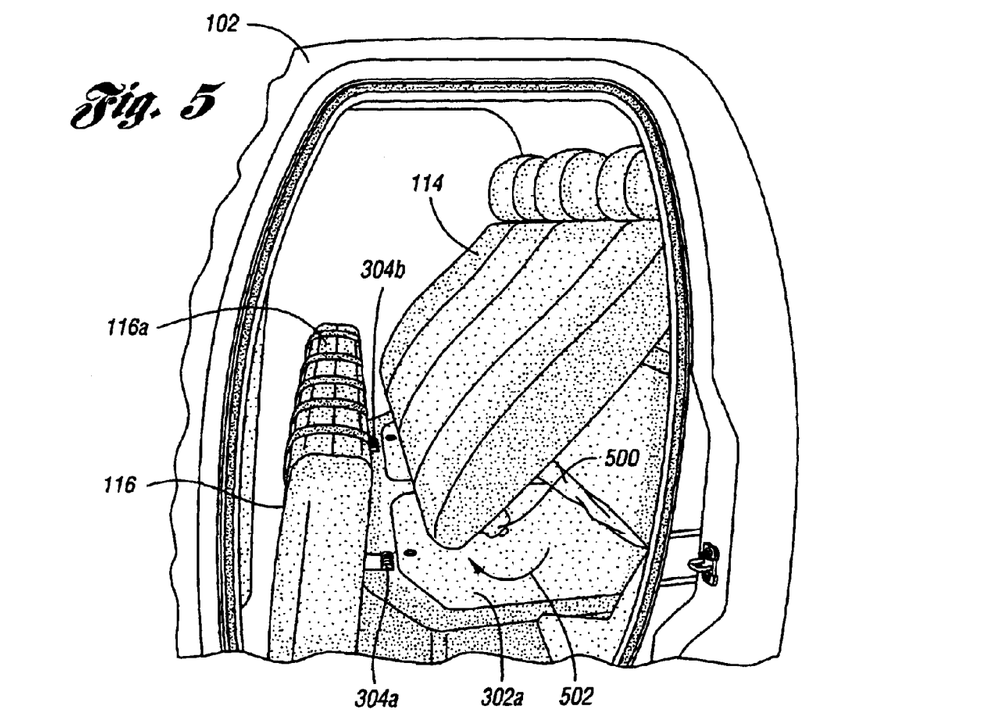
FIG. 5 shows the rear seat back partially rotated forwardly from its rest position.
Figure 15:
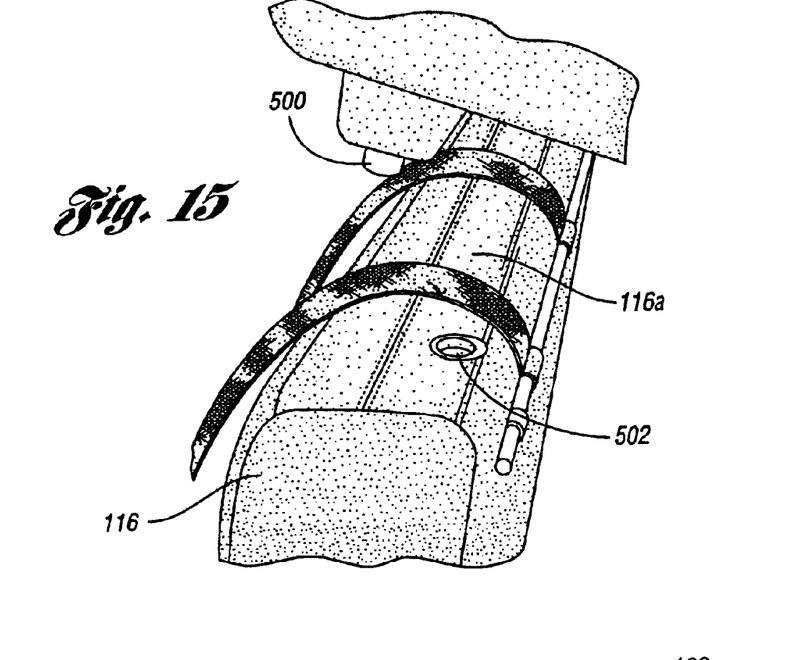
FIG. 15 shows the locating pin in an underside of the rear seat back and a receiving hole therefor in a rear end of the rear seat cushion.

With reference to FIGS. 5 and 15, rear seat back 114 is shown in the beginning stages of its forward rotation in the direction of arrow 502 about a hinge assembly proximate a top end of seat back 114 (not shown in this view). Rear seat cushion 116 is rotated to its vertical position with its rear end 116a facing a roof of passenger cabin 102. A rear surface of rear seat back 114 carries at least one locating pin 500 for mating engagement with a receptacle 502 (FIG. 15) located in rear end 116a of rear seat cushion 116.

Figure 6:
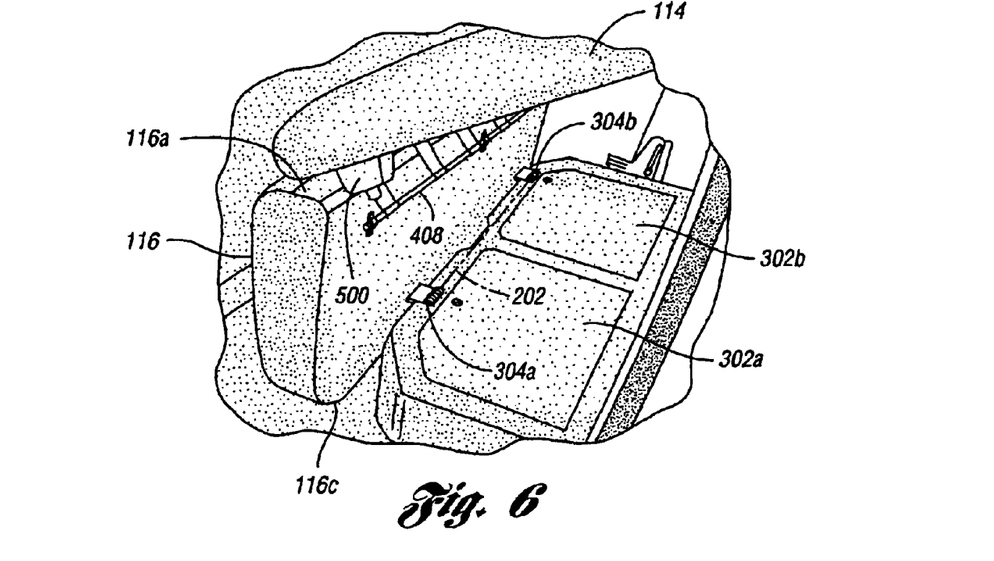
FIG. 6 shows the rear seat back in a first intermediate position allowing access to a bag assembly and to storage areas underneath the rear seat cushion.

In FIG. 6 rear seat back 114 has been rotated to a first intermediate position allowing access to a bag assembly located behind rear seat back 114, which will be discussed in detail below. Also shown in FIG. 6 is an axis of rotation 202 which substantially extends between hinges 304a and 304b for rear seat cushion 116.

Figure 7:
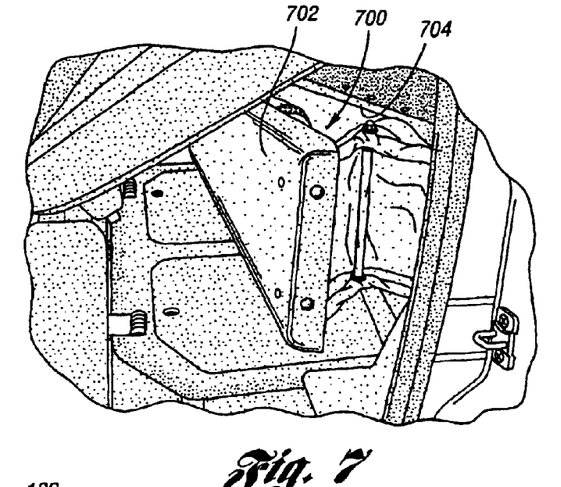
FIG. 7 is a view of the bag assembly partially moved forward from a stowed or rest position.

FIG. 7 is another view of rear seat back 114 in its first intermediate position and showing a bag assembly 700 partially moved away from its rest or stowage position in a mating opening 704 in a rear wall of passenger cabin 102. Bag assembly 700 includes a rigid end panel 702 which covers the rear wall opening in the stowed position.

Figure 8:
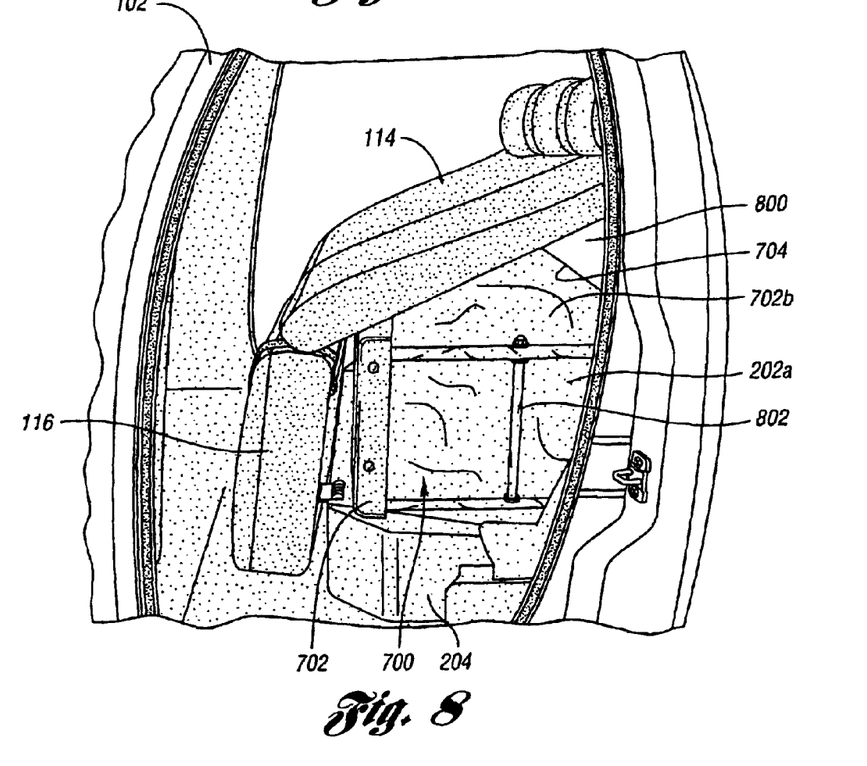
FIG. 8 shows the bag assembly in a fully extended deployed position.

In FIG. 8, bag assembly 700 has been fully extended in its deployed position. Bag assembly 700 includes, as mentioned above, a rigid front wall 702 and side walls 702a and 702b fashioned from a flexible material, such as cloth. Metal reinforcing rods 802 maintain the side walls in their vertical extension. Bag assembly 700 is open at a rear end thereof about the opening 704 of rear wall 800 of the passenger cabin.

Figure 9:
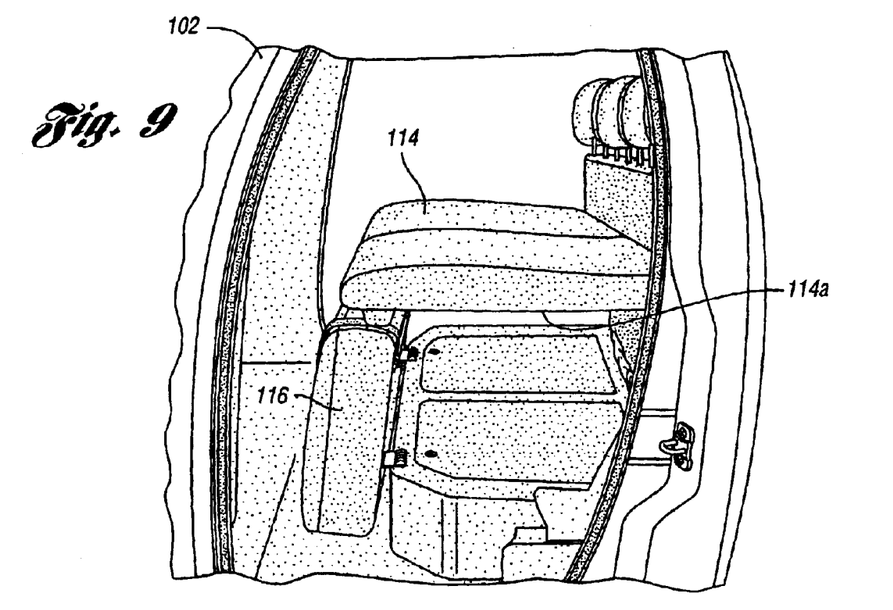
FIG. 9 shows the rear seat back in a second deployed position substantially parallel to the floor of the passenger cabin.

FIG. 9 shows rear seat back 114 in a second fully deployed position wherein the seat back surface is substantially parallel to the passenger cabin floor and ceiling with a rear surface 114a of rear seat back 114 facing the cabin floor. In this fully deployed state, rotated rear seat cushion 116 and rear seat back 114 define a substantially rectanguloid storage volume beneath rotated rear seat back 114 and between rotated rear seat cushion 116 and a rear wall of passenger cabin 102.

Figure 10:
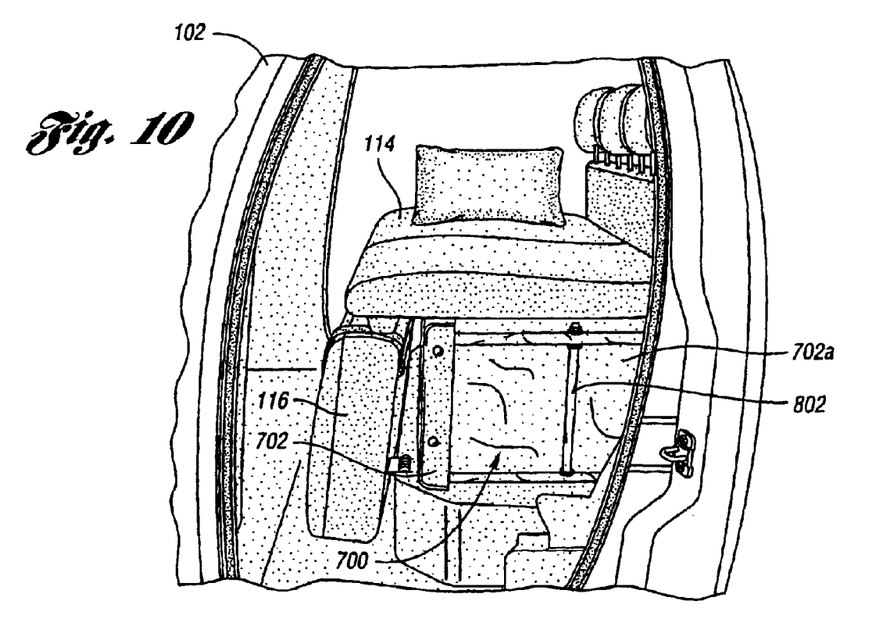
FIG. 10 shows the seat back deployed and the box assembly deployed and the seat back being used as a bed.

In FIG. 10, fully deployed rotated rear seat elements 116 and 114 are shown with bag assembly 700 fully deployed beneath rotated rear seat back 114. Additionally, as seen from FIG. 10, the substantially horizontal rear seat back 114 in its rotated position may be used as a bed surface. In this adaptation of seat back 114, the occupant containment net 400 of FIG. 4 would additionally be used to prevent an occupant reclining on surface 114 from rolling forward into the front seating area of the passenger cabin.

Figure 11:
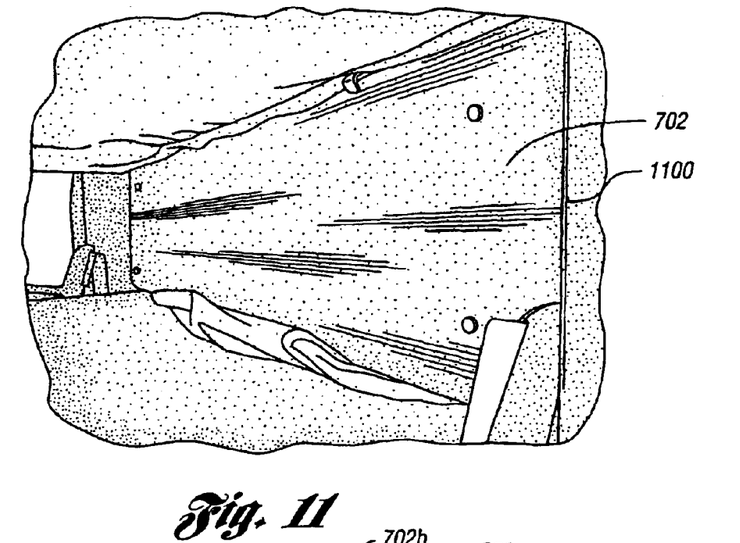
FIG. 11 shows the bag assembly in its closed or stowed position.

FIG. 11 shows the bag assembly in its closed or stowed position with rigid end panel 702 flush with interior rear wall of passenger cabin 102 so as to cover opening 704 therein.

Figure 12:
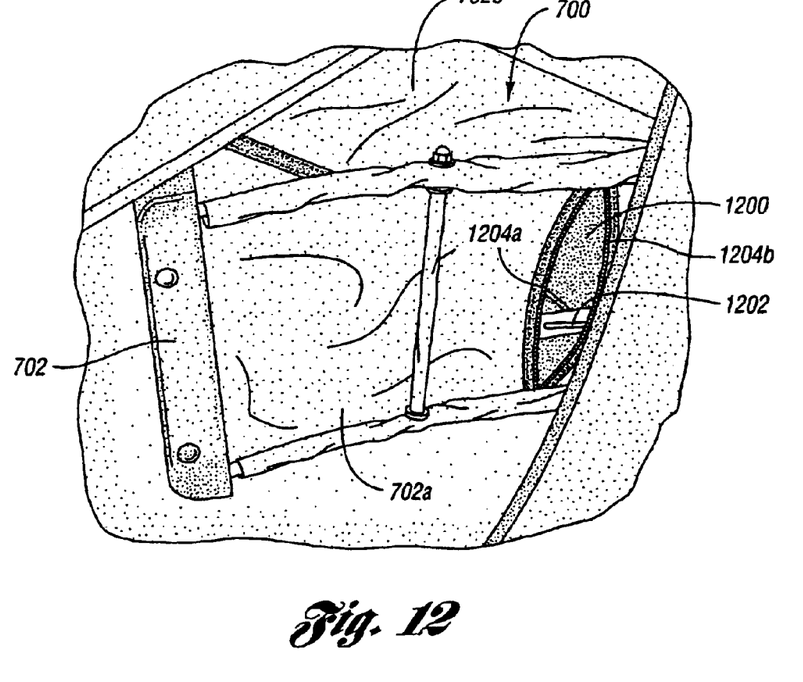
FIG. 12 shows a zipper opening in the bag assembly for access to a cargo bed door actuator.

FIG. 12 is another view of a partially deployed bag assembly 700 showing a zippered opening 1200 in the bag assembly 700 for enabling access to a cargo bed door actuator and closer 1202. Thus, the cargo bed door, to be described below, is maneuverable from inside passenger cabin 102. Alternatively, zipper halves 1204a and 1204b could define the opening 1202 in an upper surface of bag assembly 700. Additionally, alternative means of sealing the opening, such as with adhesive material could replace zipper halves 1204a and 1204b.

Figure 13:
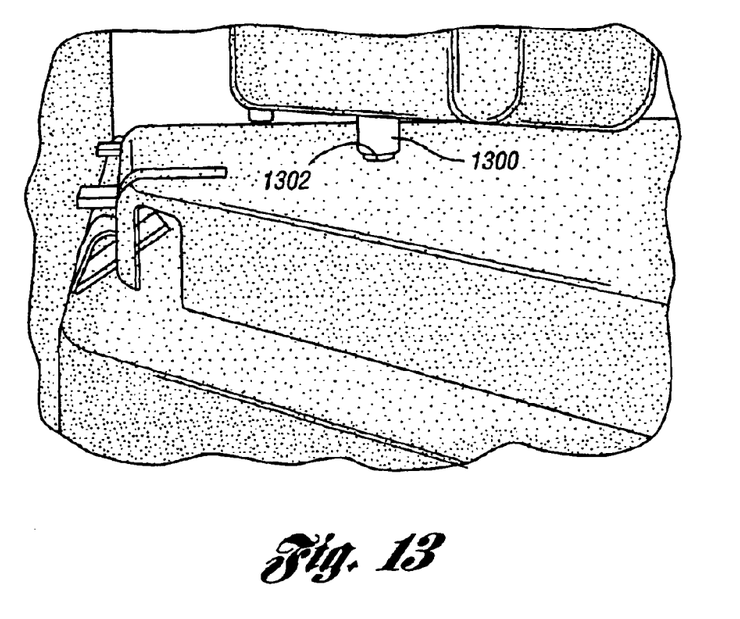
FIG. 13 shows a locating pin for the bag assembly in the front face portion of the bag assembly which mates with a locking hole in a floor of the passenger cabin.

FIG. 13 shows fully deployed bag assembly 700 with at least one bag assembly locating pin 1300 extending from beneath rigid end panel 702 for mating engagement with a locking hole 1302 formed in an upper facing surface of rear seat base 204.

Figure 14:
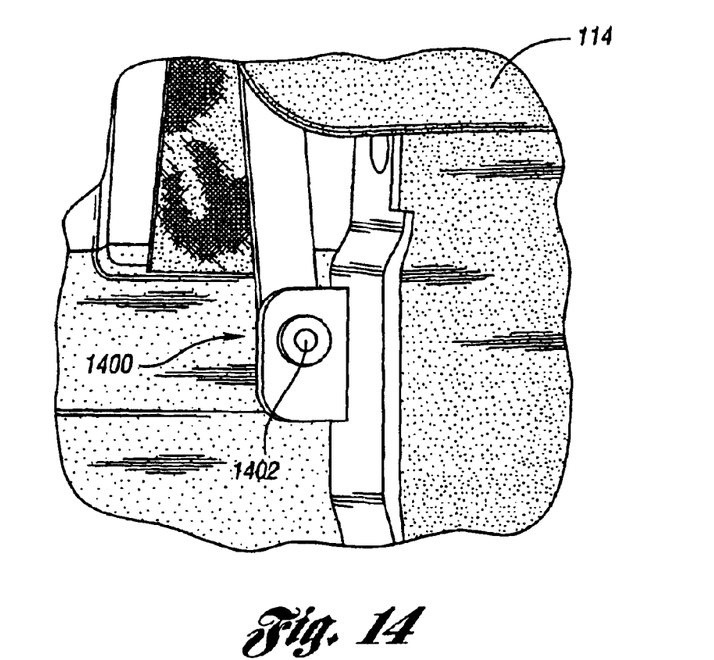
FIG. 14 shows a view of the rear seat back hinge assembly.

FIG. 14 shows rear seat back 114 in its fully rotated position to reveal a double link hinge 1400 which defines rear seat back pivot axis 1402.

Figure 16:
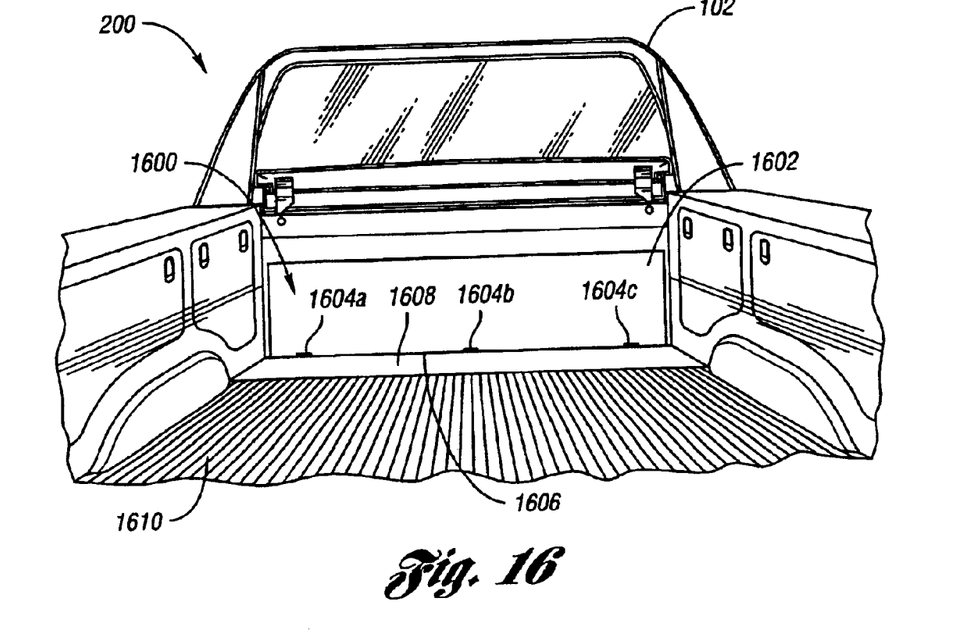
FIG. 16 shows a view from the cargo bed of the vehicle featuring a bag access door in a front wall of the cargo bed.

FIG. 16 is a view from the rear of pick-up truck 200 along cargo bed or pick-up box 1600 and showing a bag access door 1602 in a front wall of the cargo bed. A lower edge 1606 of door 1602 has hinges 1604a,b and c for enabling door 1602 to swing downwardly about its lower edge 1606 for receipt by a recessed area 1608 in floor 1610 of the cargo bed or pick-up box 1600.

Figure 17:
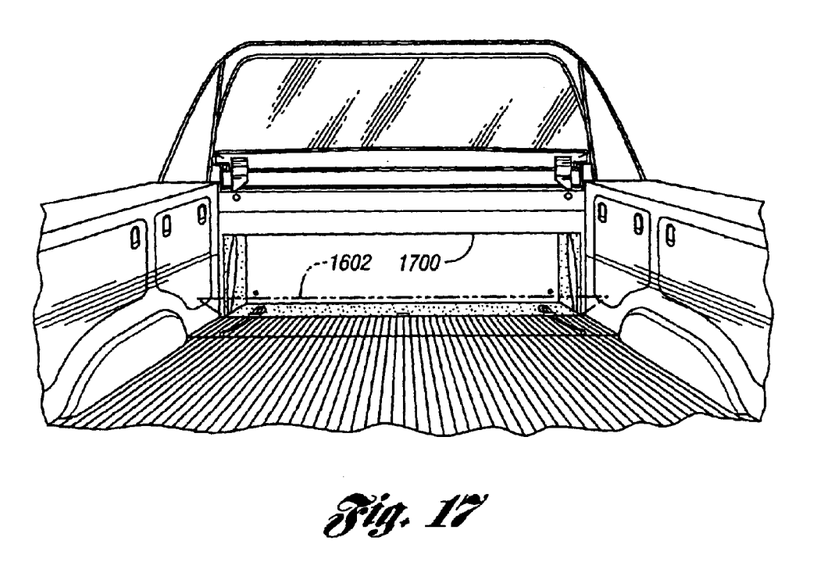
FIG. 17 is a view of FIG. 16 with the access door in a partially lowered position.

FIG. 17 is a view similar to FIG. 16 showing door 1602 in a partially lowered position and revealing opening 1700 in a front wall of the cargo bed pick-up box. Opening 1700 is in mating communication with opening 704 in the rear wall of passenger cabin 102 and further in communication with the interior of deployed bag assembly 700.

Figure 18:
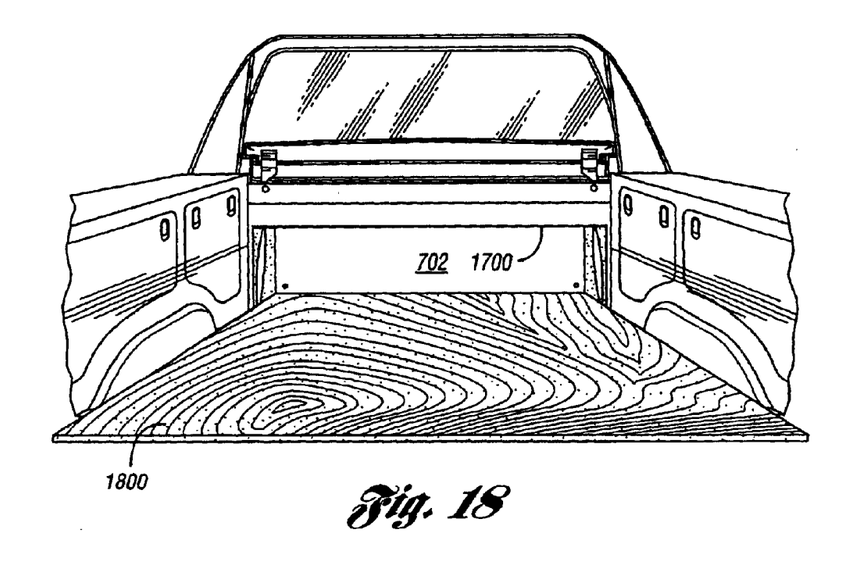
FIG. 18 shows an access door on the cargo bed fully opened and the bag assembly deployed to hold an object larger in length than the length of the exterior cargo bed.

FIG. 18 shows bag access door 1602 in a fully downward position revealing the entirety of opening 1700 and the interior of bag assembly 700. In this state, the cargo bed 1600 is effectively partially extended into the interior of passenger cabin 102 via the interior of bag assembly 700. Hence, an object such as a piece of lumber or drywall 1800 may be entirely contained within the bed even though its length is longer than the exterior length of the bed. For example, with this arrangement, a four foot by eight foot piece of plywood may be held entirely within a four foot by six foot pick-up box while two feet extends into bag assembly 700.

To summarize the aspects of the exemplary seating and cargo bed arrangement described above, and with reference to all the drawing Figures, a bottom edge of a rear seat back 114 extends behind a rear edge 116a of rear seat cushion 116 to maximize the overall height of the seat back 114.

The rear seat cushion 116 is hinged toward the front edge 116c, thereby allowing it to tumble forward to a vertical position. Positive stops are incorporated into hinges 304a,b that prevent rear seat cushion 116 from traveling beyond the vertical position.

The rear seat back 114 is hinged at top outboard corners thereof with double-link hinges 1400. An upper cross member of the seat back frame ties both hinges together to synchronize their movement. This allows bag 114 to first be rotated upwards to a substantially horizontal position and then lowered vertically until at least one pin 500, located on an underside of seat back 114 at its front edge, lines up and drops into an adjacent receptacle 502 located on rear edge 116*a* of the tumbled rear seat cushion 116. The seat back hinges 1400 and an anti-sway bracket, both attached to a rear structure of the passenger cabin, support a rear edge of the back cushion 114 to create an elevated horizontal surface that can be utilized as a bed.

Pass-through openings are added to both a front wall of the pick-up box and a rear wall of the passenger cabin. A bag assembly 700 is used to extend the length of cargo box 1600 and consists of a hard (e.g., plastic) end panel 702 with cloth sides 702*a,b*, and metal reinforcing rods 802 on outboard sides of the bag assembly. The bag 700 seals off a pass though opening 704 thus maintaining the interior environment of the passenger cabin. When the cargo bed extension bag 700 is pulled forward into the passenger cabin 102, metal rods 802 support the cloth sides 702*a* and feet 1300 on a bottom edge of end panel 702 lock the deployed bag into place.

The mating pass-through opening in the front wall of the pick-up box has a drop-down door 1602 to close off the opening when the pick-up box extension is not being utilized. The zippered opening 1200 on a surface of the bag assembly provides access to a release latch 1202 on dropdown door 1602. A recessed depression 1608 in the floor 1610 of pick-up box 1600 allows door 1602 to fall flush with floor 1608 so as not to interfere with items being loaded into the pick-up box extension.

The invention has been described with reference to an example disclosure. The scope and spirit of the invention are to be derived from the properly interpreted claims appended hereto.

What is claimed is:

1. A flexible auxiliary storage arrangement for a vehicle having a passenger cabin with front and rear passenger seats and a cargo bed extending rearwardly from a rear wall of the passenger cabin, the arrangement comprising:

a rear seat system positioned adjacent the rear wall of the passenger cabin and including a rear seat cushion having a first hinge assembly at a forward portion of its bottom side and a rear seat back having a second hinge assembly proximate its top edge;

the first hinge assembly operative to enable the rear seat cushion to rotate forwardly to a substantially vertical position with a rear end of the rear seat cushion facing a roof of the cabin; and the second hinge assembly operative to enable the rear seat back to rotate forwardly to a substantially horizontal position with a rear surface of the rear seat back resting upon the rear end of the rear seat cushion.

2. The arrangement of claim 1 further comprising:

at least one locator pin extending from one of the rear surface of the rear seat back and the rear end of the rear seat cushion; and at least one mating receptacle formed in the other one of the rear surface of the rear seat back and the rear end of the rear seat cushion;

whereby with the at least one locator pin engaging the at least one receptacle, the rotated rear seat cushion and rear seat back are coupled together to form a substantially rectanguloid storage area beneath the rotated rear seat back and between the rotated rear seat cushion and the rear wall of the cabin.

3. The arrangement of claim 2 wherein the rotated seat back is adapted for use as a bed.

4. The arrangement of claim 3 further comprising an occupant containment net adapted for attachment at opposing upper ends to the passenger cabin and having one of a seatbelt tongue and a seatbelt buckle coupled to a lower edge of the net and adapted to respectively mate with one of a seatbelt buckle and a seatbelt tongue associated with the rotated rear seat cushion.

5. The arrangement of claim 1 further comprising a recessed storage compartment positioned underneath the rear seat cushion, wherein the storage compartment is accessible when the rear seat cushion is rotated forward.

6. The arrangement of claim 1 further comprising an opening in the rear wall of the passenger cabin located behind the rear seat back and in communication with an opening in a front wall of the cargo bed, whereby a length of the cargo bed is extended when the rear seat cushion and the rear seat back are rotated forwardly.

7. The arrangement of claim 6 further comprising a bag assembly having a rigid end panel sized for mating closure of the opening in the rear wall of the passenger cabin when the bag assembly is not in use and side walls fashioned from a flexible fabric defining with the end panel an extendable storage volume in communication with the cargo bed via the opening in the front wall of the cargo bed whenever the rigid end panel is moved into the passenger cabin.

8. The arrangement of claim 7 further comprising a movable door in the cargo bed closing off the opening in the front wall of the cargo bed.

9. The arrangement of claim 8 wherein the movable door includes at least one hinge at a bottom edge thereof and further comprising a recessed depression in a floor of the cargo bed for mating receipt of the door when rotated down about the at least one hinge to expose the opening in the front wall of the cargo bed.

10. The arrangement of claim 9 further comprising a releasable latch positioned inside the bag assembly for selective opening and closing of the movable door; andan opening in a wall of the bag assembly enabling access to the releasable latch from inside the passenger cabin.

11. The arrangement of claim 10 wherein the opening includes a disengageable sealing element.

12. The arrangement of claim 11 wherein the disengageable sealing element comprises a zipper.

* * * * *